(12) United States Patent
Takayama et al.

(10) Patent No.: US 8,936,310 B2
(45) Date of Patent: Jan. 20, 2015

(54) HEADREST AND VEHICLE SEAT PROVIDED WITH THE SAME

(75) Inventors: Masami Takayama, Yokohama (JP); Kenzo Yasuda, Yokohama (JP); Atsushi Kageyama, Yokohama (JP); Satoshi Nishikido, Yokohama (JP); Eiji Shimizu, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 278 days.

(21) Appl. No.: 13/371,940

(22) Filed: Feb. 13, 2012

(65) Prior Publication Data

US 2012/0212017 A1 Aug. 23, 2012

(30) Foreign Application Priority Data

Feb. 18, 2011 (JP) ................................. 2011-033834

(51) Int. Cl.
*B60N 2/42* (2006.01)
*B60N 2/48* (2006.01)
*B60N 2/427* (2006.01)

(52) U.S. Cl.
CPC ............ *B60N 2/4847* (2013.01); *B60N 2/4221* (2013.01); *B60N 2/42745* (2013.01); *B60N 2/4844* (2013.01); *B60N 2/4885* (2013.01)
USPC ....................... 297/216.12; 297/391; 297/408

(58) Field of Classification Search
USPC ........................ 297/216.12, 216.14, 391, 308
See application file for complete search history.

(56) References Cited

U.S. PATENT DOCUMENTS

| | | | | |
|---|---|---|---|---|
| 5,236,246 A | * | 8/1993 | Harrell | 297/408 |
| 5,328,244 A | * | 7/1994 | Ishihara et al. | 297/391 |
| 6,068,337 A | * | 5/2000 | De Filippo | 297/391 |
| 6,419,322 B2 | * | 7/2002 | Nakane et al. | 297/408 |
| 7,537,282 B2 | * | 5/2009 | Veine et al. | 297/216.12 |
| 8,287,040 B2 | * | 10/2012 | Hojnacki et al. | 297/216.12 |
| 8,322,790 B2 | * | 12/2012 | Tscherbner | 297/408 |
| 8,414,078 B2 | * | 4/2013 | Fujita | 297/408 |
| 2010/0117432 A1 | * | 5/2010 | Lutzka et al. | 297/408 |

FOREIGN PATENT DOCUMENTS

| | | |
|---|---|---|
| JP | 60-160755 | 10/1985 |
| JP | 63-35651 | 9/1988 |
| JP | 7-11455 U | 2/1995 |
| JP | 2006-027575 A | 2/2006 |
| JP | 2007-290437 | 11/2007 |
| JP | 2007-296048 A | 11/2007 |

OTHER PUBLICATIONS

Japanese Office Action dated Mar. 26, 2013 for the corresponding Japanese Patent Application No. 2011-033834.

* cited by examiner

*Primary Examiner* — Peter Brown
(74) *Attorney, Agent, or Firm* — Knobbe Martens Olson & Bear LLP (57) ABSTRACT

A headrest including: a headrest body that supports a head portion of an occupant; a pair of side frame sections that supports the headrest body, the side frame sections extending along a seat height direction and disposed at a separation from each other along a seat width direction; and an inclined wall portion that is provided between the side frame sections, that is inclined towards a seat front-rear direction front side with respect to the side frame sections such that a lower end portion of the inclined wall portion is positioned further to the seat front-rear direction front side than an upper end portion of the inclined wall portion, and that bears load acting on the headrest body from a seat front-rear direction rear side.

3 Claims, 8 Drawing Sheets

FIG.8 ions farther forward than an upper end portion of the inclined wall portion relative to the plane, and that bears load acting on the headrest body from a seat front-rear direction rear side.

HEADREST AND VEHICLE SEAT PROVIDED WITH THE SAME

CROSS-REFERENCE TO RELATED APPLICATION

This application is claims priority under 35 USC 119 from Japanese Patent Application No. 2011-033834 filed Feb. 18, 2011, the disclosure of which is incorporated by reference herein.

BACKGROUND

1. Technical Field

The present invention relates to a headrest and a vehicle seat provided with the same.

2. Related Art

Vehicle seats provided with headrests for supporting the head portion of an occupant are known. With various of these vehicle seats, there is a possibility of the head portion of an occupant seated in a seat to the rear of the vehicle seat moving towards the vehicle front due to inertia during a frontal collision (vehicle frontal impact), with the possibility of the head portion then making contact with the rear portion of the headrest of the vehicle seat. In such cases, for a headrest that is tilted at a small angle of tilt towards the vehicle front, the component force acting on the headrest towards the vehicle front is relatively large when the head portion of the occupant contacts the rear portion of a headrest, and so the seat back supporting the headrest rotates towards the vehicle front, thereby absorbing impact to the headrest. Consequently, the reaction force to the head portion of the occupant is comparatively small.

However, for a headrest tilted towards the vehicle front with a large angle of tilt, the component force acting on the headrest in the vehicle downwards direction is relatively large when the head portion of the occupant contacts the rear portion of the headrest. Also, as described for example in Japanese Utility Model Application Laid-Open (JP-U) No. 63-35651 in which a headrest is provided with a tilting mechanism for adjusting the angle of tilt of the headrest, in a state in which the headrest is tilted towards the vehicle front direction to the maximum extent, the component force acting on the headrest in the vehicle downwards direction is at a maximum when the head portion of an occupant contacts the rear portion of the headrest. Accordingly, since it is difficult for the seat back to rotate towards the vehicle front direction, the amount of impact to the headrest absorbed is reduced, and the reaction force to the head portion of the occupant becomes comparatively large.

SUMMARY

In consideration of the above circumstances, the present invention provides a headrest capable of reducing reaction force to the head portion of an occupant seated in a seat during a frontal collision, and to a vehicle seat provided with such a headrest.

A headrest of a first aspect of the present invention includes: a headrest body that supports a head portion of an occupant; a pair of side frame sections that supports the headrest body, the side frame sections extending along a seat height direction and disposed at a separation from each other along a seat width direction; and an inclined wall portion that is provided between the side frame sections, that is inclined with respect to a plane defined by the side frame sections such that a lower end portion of the inclined wall portion is positioned farther forward than an upper end portion of the inclined wall portion relative to the plane, and that bears load acting on the headrest body from a seat front-rear direction rear side.

According to a headrest of the first aspect, the inclined wall portion for bearing load acting on the headrest body from the seat front-rear direction rear side is provided between the side frame sections. The inclined wall portion is inclined with respect to a plane defined by the side frame sections, such that a lower end portion of the inclined wall portion is positioned farther forward than an upper end portion of the inclined wall portion relative to the plane.

Consequently, compared to a configuration in which the inclined wall portion is not inclined with respect to the side frame sections, the component force that acts on the inclined wall portion towards the seat front-rear direction front side is larger when the head portion of an occupant seated in the seat makes contact with the rear portion of the headrest cushion in, for example, a frontal collision. Therefore, the seat back to which the headrest is attached rotates readily towards the seat front-rear direction front side. Impact to the headrest is absorbed as the seat back rotates towards the seat front-rear direction front side. Thus the reaction force on the head portion of the occupant is reduced.

A headrest of a second aspect of the present invention is the headrest of the first aspect further including a tilting mechanism that is provided at the side frame sections for supporting the headrest body such that the headrest body is capable of being tilted in a seat front-rear direction with respect to the side frame sections According to a headrest of the second aspect, in a state in which the headrest body is tilted with respect to the side frame sections towards the seat front-rear direction front side by the tilting mechanism, compared to a state in which the headrest body is not tilted with respect to the side frame sections, the component force that acts on the headrest body in the seat height direction is larger when the head portion of an occupant makes contact with the rear portion of the headrest body. The present invention is particularly effective for headrests provided with a tilting mechanism such as this, as due to being provided with the inclined wall portion between the side frame sections, the component force that acts on the inclined wall portion towards the seat front-rear direction front side increases. Therefore when the head portion of an occupant seated in the seat makes contact with the rear portion of the headrest cushion body in, for example, a frontal collision, the reaction force on the head portion of the occupant is reduced.

A headrest of a third aspect of the present invention is a headrest of the first aspect, further including: a top frame section that extends along the seat width direction and connects together the upper end portions of the side frame sections; and a pressure bearing member that is configured with an inverted T-shaped profile as viewed from the seat front-rear direction rear side, and spans between the pair of side frame sections and the top frame section. The inclined wall portion is provided at a seat width direction intermediate portion of the pressure bearing member.

According to a headrest of the third aspect, the pressure bearing member spans between the top frame section and the pair of side frame sections. The inclined wall portion is provided to the pressure bearing member at an intermediate portion in the seat width direction. The load acting on the inclined wall portion is thus efficiently transmitted to the top frame section and the pair of side frame sections when the head portion of an occupant seated in the seat makes contact with the rear portion of the headrest cushion body in, for example, a frontal collision. Therefore, the seat back to which the headrest is attached rotates readily towards the seat front-rear direction front side. Impact to the headrest is absorbed as the seat back rotates towards the seat front-rear direction front side. Thus the reaction force on the head portion of the occupant is reduced.

A vehicle seat of a fourth aspect of the present invention includes a seat cushion on which an occupant sits; a seat back that supports a back portion of the occupant, the seat back provided at a rear end portion of the seat cushion to as to be capable of reclining; and the headrest of the first aspect that is provided at an upper end portion of the seat back for supporting the head portion of the occupant.

According to a vehicle seat of the fourth aspect, due to being provided with a headrest of the first aspect, the component force that acts on the inclined wall portion towards the seat front-rear direction front side increases when the head portion of an occupant seated in the seat makes contact with the rear portion of the headrest cushion body in, for example, a frontal collision, compared with a configuration in which the inclined wall portion is not tilted with respect to the side frame sections. Therefore, the seat back to which the headrest is attached rotates readily towards the seat front-rear direction front side. Impact to the headrest is absorbed as the seat back rotates towards the seat front-rear direction front side. Thus the reaction force on the head portion of the occupant is reduced.

Furthermore, the configuration is such that the inclined wall portion is inclined with respect to a plane defined by the side frame sections such that a lower end portion of the inclined wall portion is positioned farther forward than an upper end portion of the inclined wall portion relative to the plane, and so the thickness of the headrest body in the seat front-rear direction can be made thinner. A reduction in weight of the vehicle seat and an increase in vehicle cabin space can therefore be achieved.

BRIEF DESCRIPTION OF THE DRAWINGS

Exemplary embodiments of the present invention will be described in detail based on the following figures, wherein.

DETAILED DESCRIPTION

Explanation follows regarding a vehicle seat according to an exemplary embodiment of the present invention, with reference to the drawings. Arrow X, arrow Y and arrow Z in each of the drawings respectively indicate a seat front-rear direction front side, a seat width direction outside and a seat height direction upper side in a vehicle seat according to each of the exemplary embodiments.

—Headrest—

Figure 1:
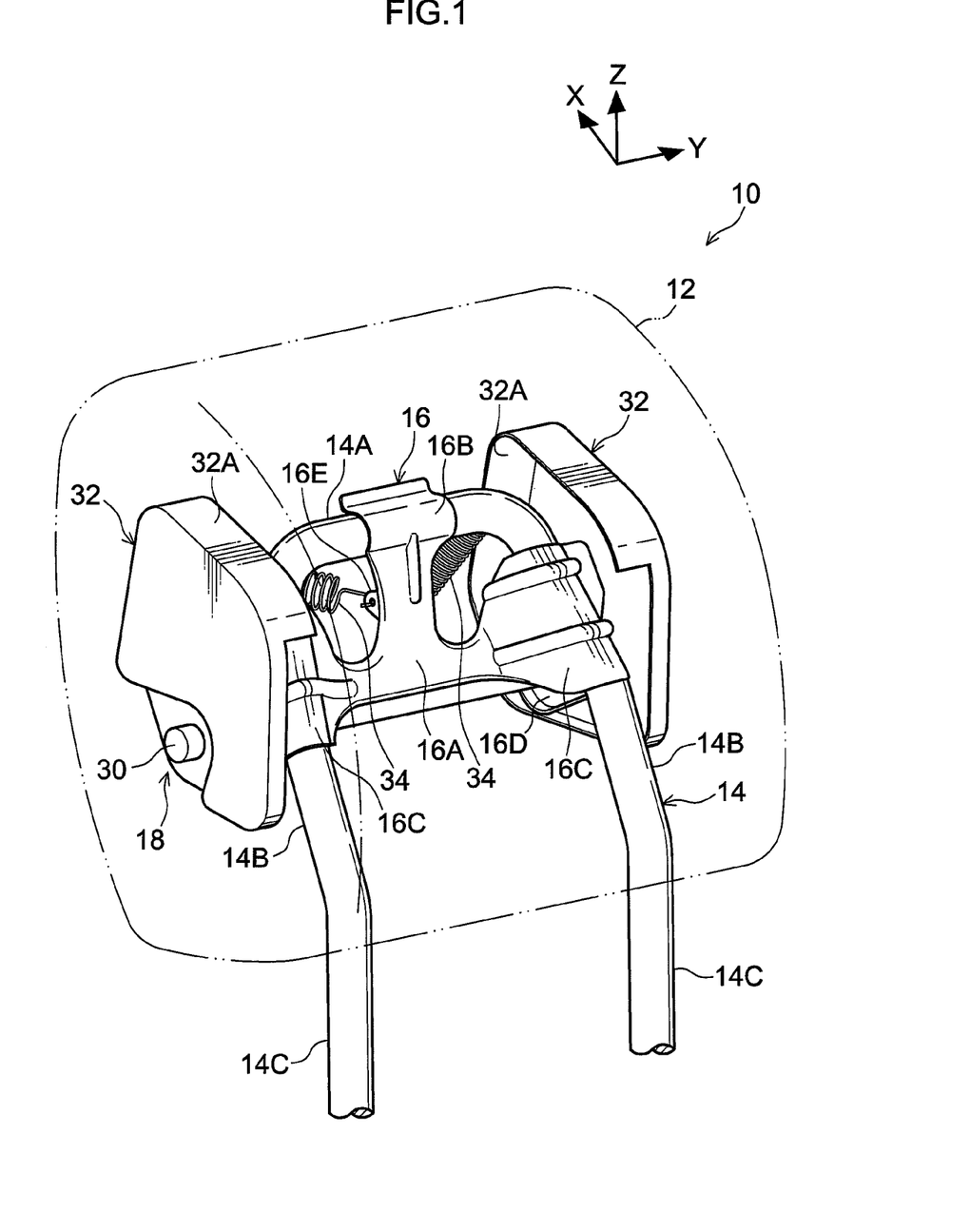
FIG. 1 is a perspective view illustrating a headrest according to an exemplary embodiment of the present invention.

FIG. 1 illustrates a headrest 10 according to the present exemplary embodiment. The headrest 10 includes: a headrest cushion 12 covered with a not-illustrated surface covering and serving as a headrest body for supporting the head portion of an occupant; a headrest frame 14 for supporting the headrest cushion 12; a pressure bearing member 16 provided at the headrest frame 14; and a tilting mechanism 18 for adjusting the angle of tilt of the headrest cushion 12 with respect to the headrest frame 14.

—Headrest Frame—

The headrest frame 14 is formed by bending a steel tube into an inverted U-shape, and includes: a top frame section 14A provided inside the headrest cushion 12 and extending along the seat width direction; a pair of side frame sections 14B that extend downwards in the seat height direction from the two seat width direction end portions of the top frame section 14A, with the bottom end portions of the side frame sections 14B extending from inside the headrest cushion 12 out downwards in the seat height direction; and a pair of headrest stay sections 14C that extend out downwards in the seat height direction from bottom end portions of the side frame sections 14B. The pair of side frame sections 14B are disposed so as to extend along the seat height direction at a separation from each other along the seat width direction. The side frame sections 14B are inclined towards the front side in the seat front-rear direction with respect to the headrest stay sections 14C. The headrest stay sections 14C are attached to headrest brackets provided at the upper end portions of a seatback frame, not shown in the drawings.

—Pressure Bearing Member—

Figure 2:
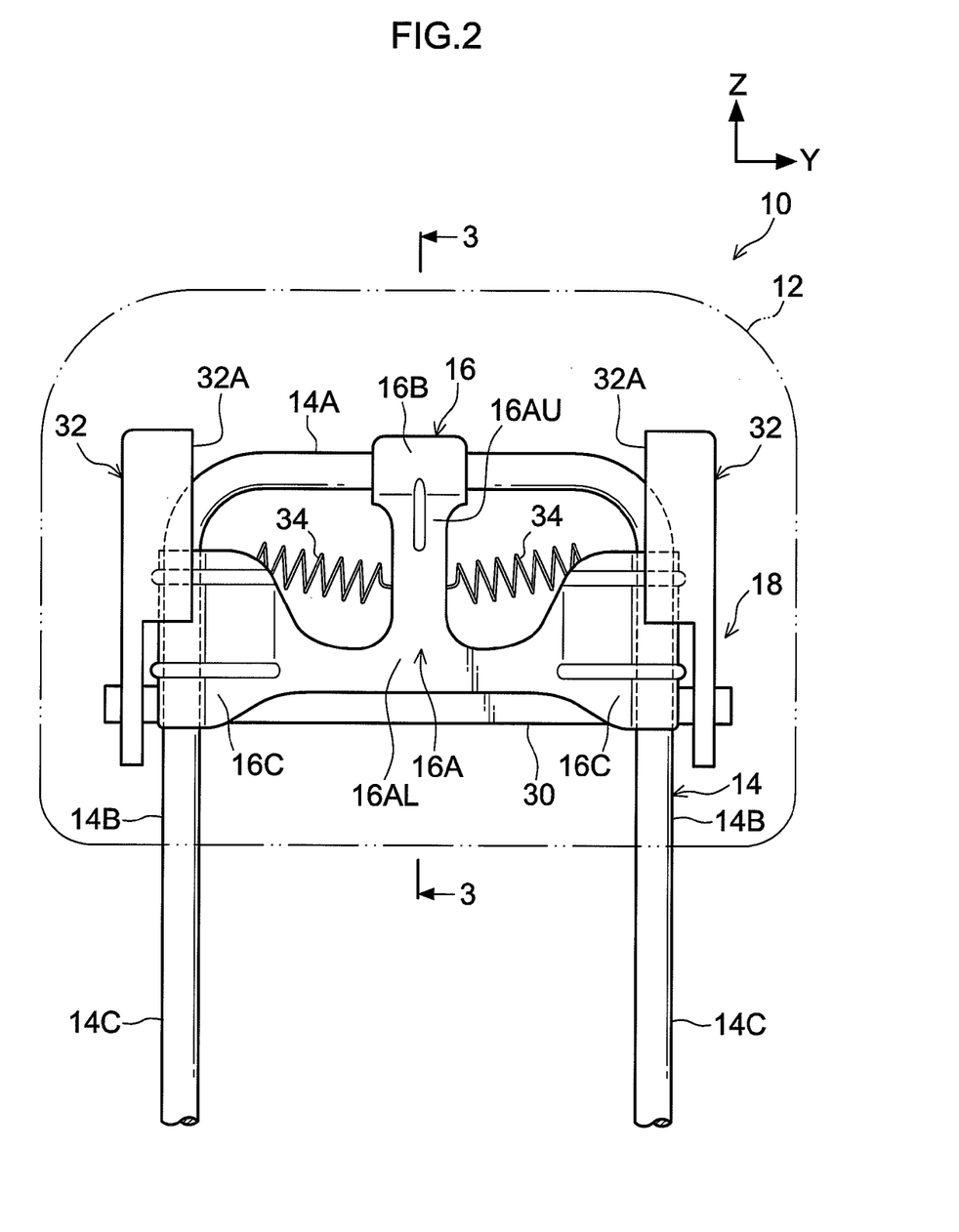
FIG. 2 is a face-on view of a headrest according to an exemplary embodiment of the present invention, as viewed from the seat front-rear direction rear side.

As shown in FIG. 2, the pressure bearing member 16 is formed by press working a steel plate, for example, and is configured with an inverted substantially T-shaped profile as viewed from the seat front-rear direction rear side. The pressure bearing member 16 is equipped with an inclined wall portion 16A, a top frame section attachment portion 16B, a pair of side frame section attachment portions 16C, and a pair of support wall portions 16D (see FIG. 3). The pressure bearing member 16 is attached so as to span between the top frame section 14A and the pair of side frame sections 14B.

The inclined wall portion 16A is configured with an inverted substantially T-shaped profile as viewed from the seat front-rear direction rear side, and is disposed between the pair of side frame sections 14B. The inclined wall portion 16A is provided so as to correspond to the location (contact portion) the head portion of a seated occupant in a seat (not shown in the drawings) contacts on the rear portion of the headrest cushion 12 during a mainly frontal collision (referred to below simply as "frontal collision"), so as to bear load acting on the headrest cushion 12 from the seat front-rear direction rear side. Note that reference to an occupant here corresponds to a person of standard build according to the country or portion in which the headrest 10 of the present exemplary embodiment is to be used. A spring attachment member 16E (see FIG. 1) is provided on the rear face of the inclined wall portion 16A (the face on the seat front-rear direction front side) for attaching end portions of coil springs 34 of the tilting mechanism 18, described later.

The top frame section attachment portion 16B is provided at a seat height direction upper end portion 16AU of the inclined wall portion 16A. The top frame section attachment portion 16B is formed with a C-shaped cross-sectional profile disposed such that the axial direction is along the seat width direction, and an opening side where the cross-section is open faces towards the seat front-rear direction front side. The top frame section 14A is fitted into the top frame section attachment portion 16B and the pressure bearing member 16 is attached to the top frame section 14A by joining such as by welding.

The side frame section attachment portions 16C are respectively attached to the two seat width direction end portions of lower end portion 16AL of the inclined wall portions 16A. The side frame section attachment portions 16C are formed with C-shaped cross-sectional profiles, and are disposed with axial directions along the seat height direction and the opening side, where the cross-section is open, facing towards the seat front-rear direction front side. The side frame sections 14B fit into the side frame section attachment portions 16C, and the pressure bearing member 16 is attached to the side frame sections 14B by joining, such as by welding.

Figure 3:
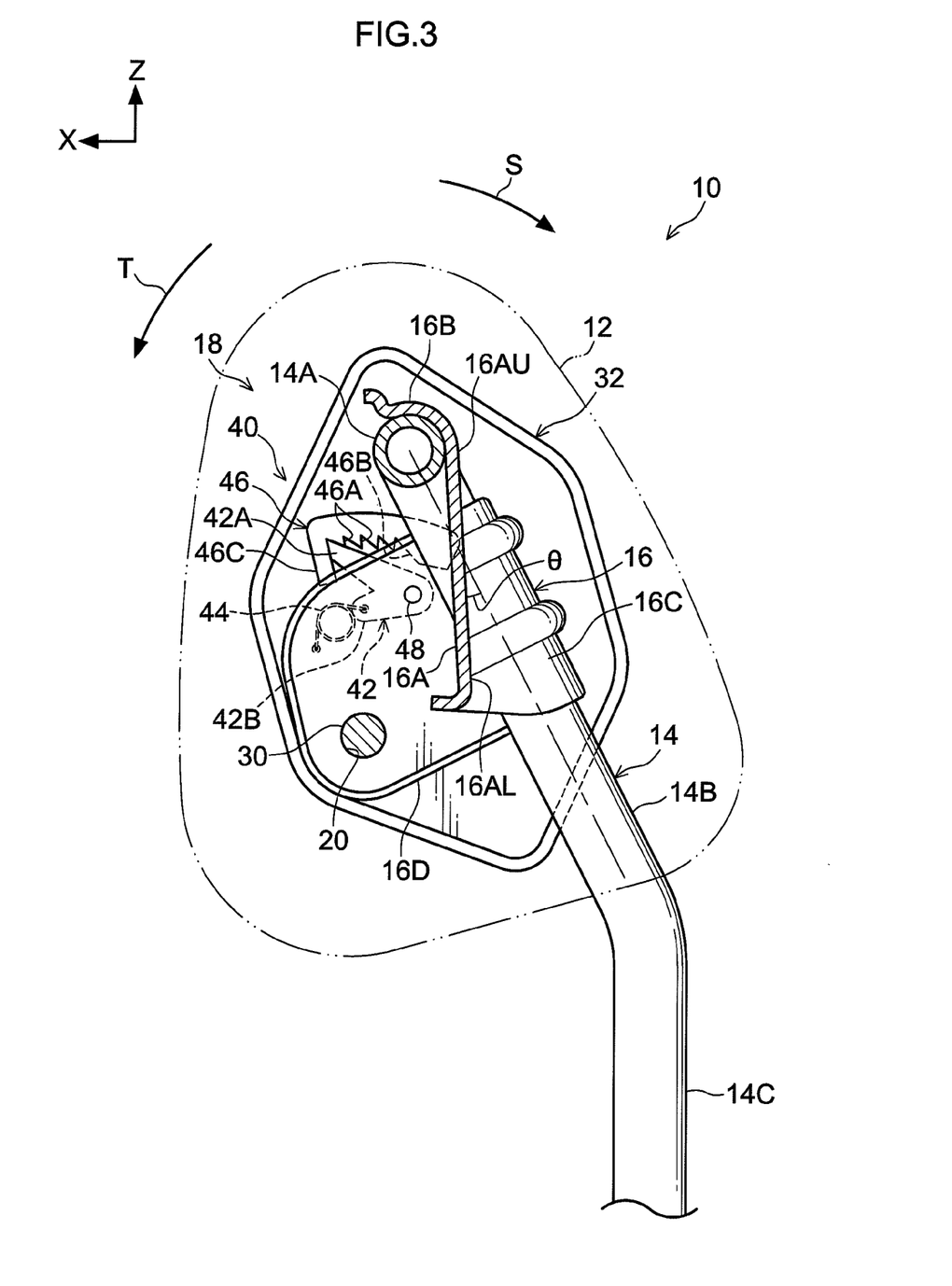
FIG. 3 is a cross-section of a headrest according to an exemplary embodiment of the present invention taken on line 3-3 of FIG. 2, and illustrating a state in which a headrest cushion is held in an initial position.

As shown in FIG. 3, the support wall portions 16D are respectively provided at the seat width direction outside end portions of the side frame section attachment portions 16C so as to extend from the end portions towards the seat front-rear direction front side. The support wall portions 16D are formed with a substantially rectangular profile as viewed from the seat width direction, and are disposed facing each other along the seat width direction. Through holes 20 are formed through lower portions of each of the support wall portions 16D for a rotation shaft 30 of the tilting mechanism 18, described later, to pass through.

The inclined wall portion 16A is inclined at an angle of inclination θ towards the seat front-rear direction front side with respect to the side frame sections 14B such that the lower end portion 16AL is positioned to the seat front-rear direction front side with respect to the upper end portion 16AU. Due to such a configuration, the component force acting on the inclined wall portion 16A towards the seat front-rear direction front side is larger when the head portion of an occupant seated on a seat, not shown in the drawings, makes contact with the rear portion of the headrest cushion 12 due to a frontal collision than is the case for a configuration in which the inclined wall portion 16A is not inclined with respect to the side frame sections 14B (angle of inclination θ=0°.

—Tilting Mechanism—

As shown in FIG. 3, the tilting mechanism 18 includes: a rotation shaft 30 extending in the seat width direction; side covers 32 serving as rotating bodies that are rotatably supported by the rotation shaft 30; coil springs 34 (see FIG. 2) serving as resilient bodies for biasing the side covers 32 so as to rotate towards the seat front-rear direction rear side; and a ratchet mechanism 40 that permits rotation of the side covers 32 towards the seat front-rear direction front side (the arrow T direction) but restricts rotation of the side covers 32 towards the seat front-rear direction rear side (the arrow S direction). FIG. 3 illustrates the state in which the headrest cushion 12 is held in the initial position (when the angle of tilt towards the seat front-rear direction front side is at a minimum).

The rotation shaft 30 is disposed with an axial direction along the seat width direction. The two axial direction end portions of the rotation shaft 30 pass through the respective through holes 20 formed in each of the support wall portions 16D of the pressure bearing member 16, so as to support the rotation shaft 30. The side covers 32 are rotatably attached to the two axial direction end portions of the rotation shaft 30. The headrest cushion 12 is supported from the headrest frame 14 through the side covers 32, such that the angle of tilt of the headrest cushion 12 changes according to the angle of rotation of the side covers 32. The side covers 32 are formed with a substantially rectangular profile as viewed from the seat width direction, and ribs 32A that project out towards the seat width direction inside are provided at outer peripheral portions of the side covers 32. Spring attachment portions (not shown in the drawings) are also provided to the ribs 32A at the seat front-rear direction front side of the side covers 32, to which end portions of the coil springs 34 are attached (see FIG. 2). The other end portions of the coil springs 34 are attached to the spring attachment member 16E (see FIG. 1) provided at the inclined wall portion 16A of the above-mentioned pressure bearing member 16, such that the side covers 32 are constantly biased by the coil springs 34 so as to rotate towards the seat front-rear direction rear side (the arrow S direction) about the rotation shaft 30. Configuration is made such that the headrest cushion 12 is tilted towards the seat front-rear direction front side by rotating the side covers 32 against the coil springs 34 towards the seat front-rear direction front side.

The ratchet mechanism 40 includes a pawl 42, a reversing torsion spring 44 and a ratchet plate 46. The pawl 42 is disposed between the support wall portions 16D of the pressure bearing member 16 and the side covers 32, and is rotatably supported by the support wall portions 16D through a pin 48. A hook portion 42A that projects out towards the seat height direction upper side is provided at an upper end portion of the pawl 42. A spring attachment portion 42B is provided to the pawl 42 at the seat height direction bottom side of the hook portion 42A, and one end of the reversing torsion spring 44 is attached to the spring attachment portion 42B. The reversing torsion spring 44 is disposed between the support wall portions 16D of the pressure bearing member 16 and the side covers 32, with the other end portion of the reversing torsion spring 44 attached to the support wall portion 16D. The reversing torsion spring 44 is a reciprocating spring with biasing direction for reciprocating rotation (reverse rotation) according to the rotation angle of the pawl 42, as described later. Configuration is such that the pawl 42 is biased so as to rotate towards the seat front-rear direction rear side (the arrow S direction) about the pin 48 when in a state in which the hook portion 42A is engaged in a ratchet teeth portion 46A, described later.

The ratchet plate 46 is provided to the face of the side covers 32 on the seat width direction inside, and is capable of rotating as one with the side covers 32 about the rotation shaft 30. Plural ratchet teeth portions 46A are arrayed along the seat front-rear direction at the bottom face of the ratchet plate 46. Configuration is such that the hook portion 42A of the pawl 42 is capable of engaging with each of the ratchet teeth portions 46A. A configuration is accordingly achieved in which the side covers 32 are held at a specific angle of rotation while being constantly biased by the coil springs 34 towards the seat front-rear direction rear side (the arrow S direction). However, when the hook portion 42A of the pawl 42 is pushed down by the ratchet teeth portions 46A accompanying rotation of the side covers 32 in the seat front-rear direction front side (the arrow T direction) and rotates towards the seat front-rear direction front side (the arrow T direction) against biasing force of the reversing torsion spring 44, the hook portion 42A comes away from a given ratchet teeth portion 46A and relatively moves towards a second of the ratchet teeth portions 46A adjacent on the seat front-rear direction rear side, so as to engage with the second ratchet teeth portion 46A.

A pressing down portion 46B is provided to the ratchet plate 46 at the seat front-rear direction rear side of the ratchet teeth portions 46A. The pressing down portion 46B presses the hook portion 42A of the pawl 42 downwards in the seat height direction and reverses the biasing direction of the reversing torsion spring 44. The pressing down portion 46B projects out further to the seat side direction bottom side than the ratchet teeth portions 46A, such that the pawl 42 is pressed down by the pressing down portion 46B and rotated towards the seat front-rear direction front side (the arrow T direction), thereby reversing the biasing direction of the reversing torsion spring 44, such that the pawl 42 is held in a state biased towards the seat front-rear direction front side (the arrow T direction).

A stopper portion 46C for reversing the biasing direction of the reversing torsion spring 44 is provided to the ratchet plate 46 at the seat front-rear direction front side of the ratchet teeth portions 46A for engaging with the hook portion 42A of the pawl 42 and pressing up the hook portion 42A towards the seat height direction upper side. The biasing direction of the reversing torsion spring 44 is reversed by the pawl 42 being pressed upwards by the stopper portion 46C and rotated towards the seat front-rear direction rear side (the arrow S direction), such that the pawl 42 is biased towards the seat front-rear direction rear side (the arrow S direction) and the hook portion 42A engages with the ratchet teeth portions 46A. The leading end portion of the stopper portion 46C extends out further to the seat height direction bottom side than the ratchet teeth portions 46A such that the hook portion 42A of the pawl 42 is able to engage therewith.

Explanation follows regarding a method for adjusting the angle of tilt of the headrest cushion 12. FIG. 3 illustrates the headrest cushion 12 held in the initial position. When an occupant grabs the headrest cushion 12 in this state and tilts the headrest cushion 12 towards the seat front-rear direction front side (the arrow T direction) against biasing force of the coil springs 34 (in the arrow S direction), the side covers 32 rotate in the same direction about the rotation shaft 30. When the ratchet plate 46 provided at the side covers 32 is rotated in the seat front-rear direction front side (the arrow T direction) accompanying the rotation of the side covers 32, the hook portion 42A of the pawl 42 is pushed down by the ratchet teeth portions 46A and rotated towards the seat front-rear direction front side (the arrow T direction). The hook portion 42A of the pawl 42 thereby separates from the ratchet teeth portion 46A and moves towards another of the ratchet teeth portions 46A that is adjacent on the seat front-rear direction rear side, wherein it is engaged with this other ratchet teeth portion 46A by biasing force from the reversing torsion spring 44. The angle of tilt of the headrest cushion 12 is changed as a result, and the headrest cushion 12 is then held in a position tilted further towards the seat front-rear direction front side than the initial position. The angle of tilt of the headrest cushion 12 is changed and a specific angle of tilt is held by an occupant further tilting the headrest cushion 12 towards the seat front-rear direction front side (the arrow T direction), and by the ratchet teeth portion 46A with which the hook portion 42A of the pawl 42 is engaged shifting to a ratchet teeth portion 46A at the seat front-rear direction rear side.

Figure 4:
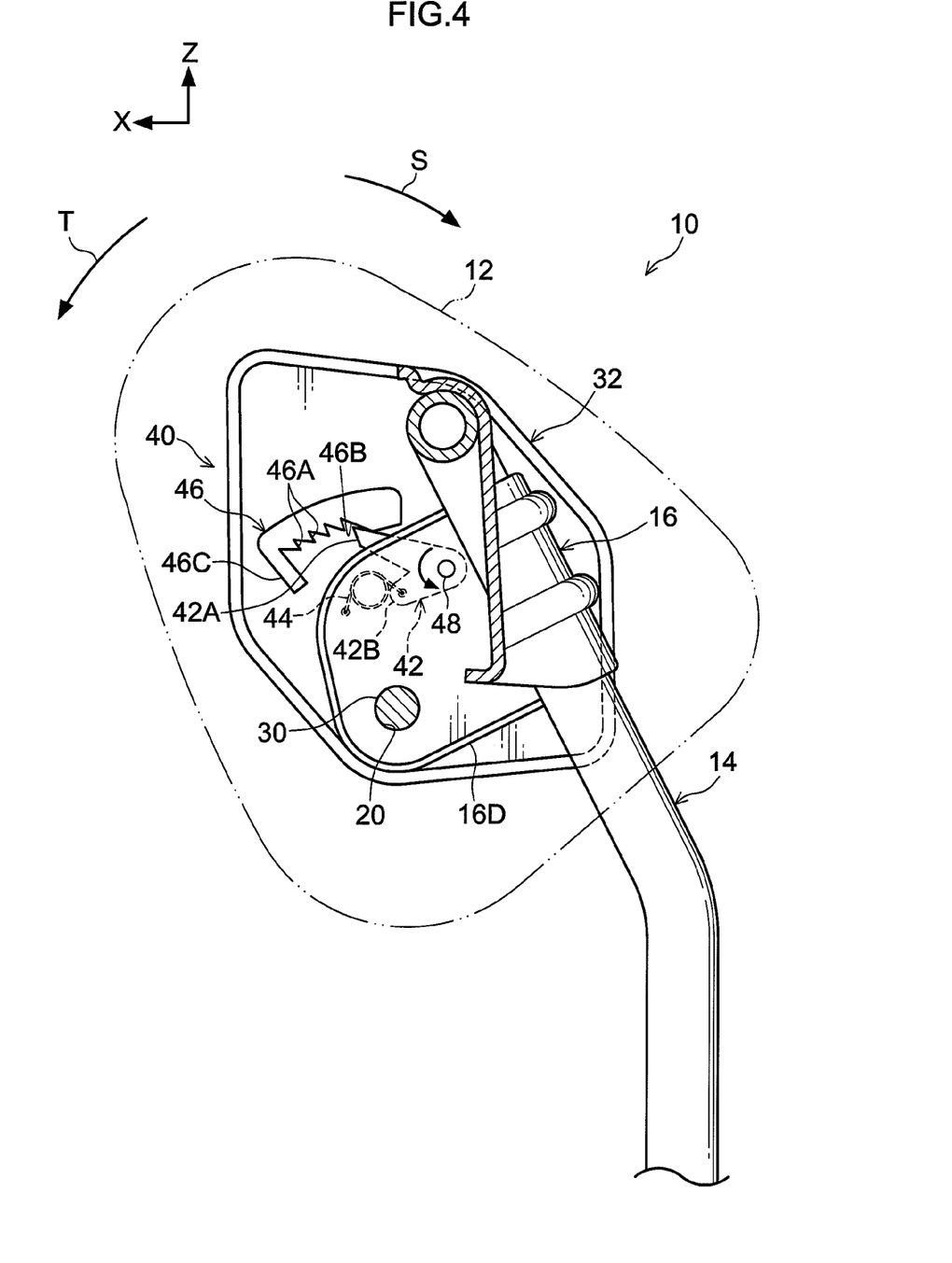
FIG. 4 is a cross-section corresponding to FIG. 3 for explaining a method of returning an angle of tilt of a headrest according to an exemplary embodiment of the present invention to the initial position, illustrating a state in the present exemplary embodiment in which a hook portion of a pawl has come out from a ratchet teeth portion.
Figure 5:
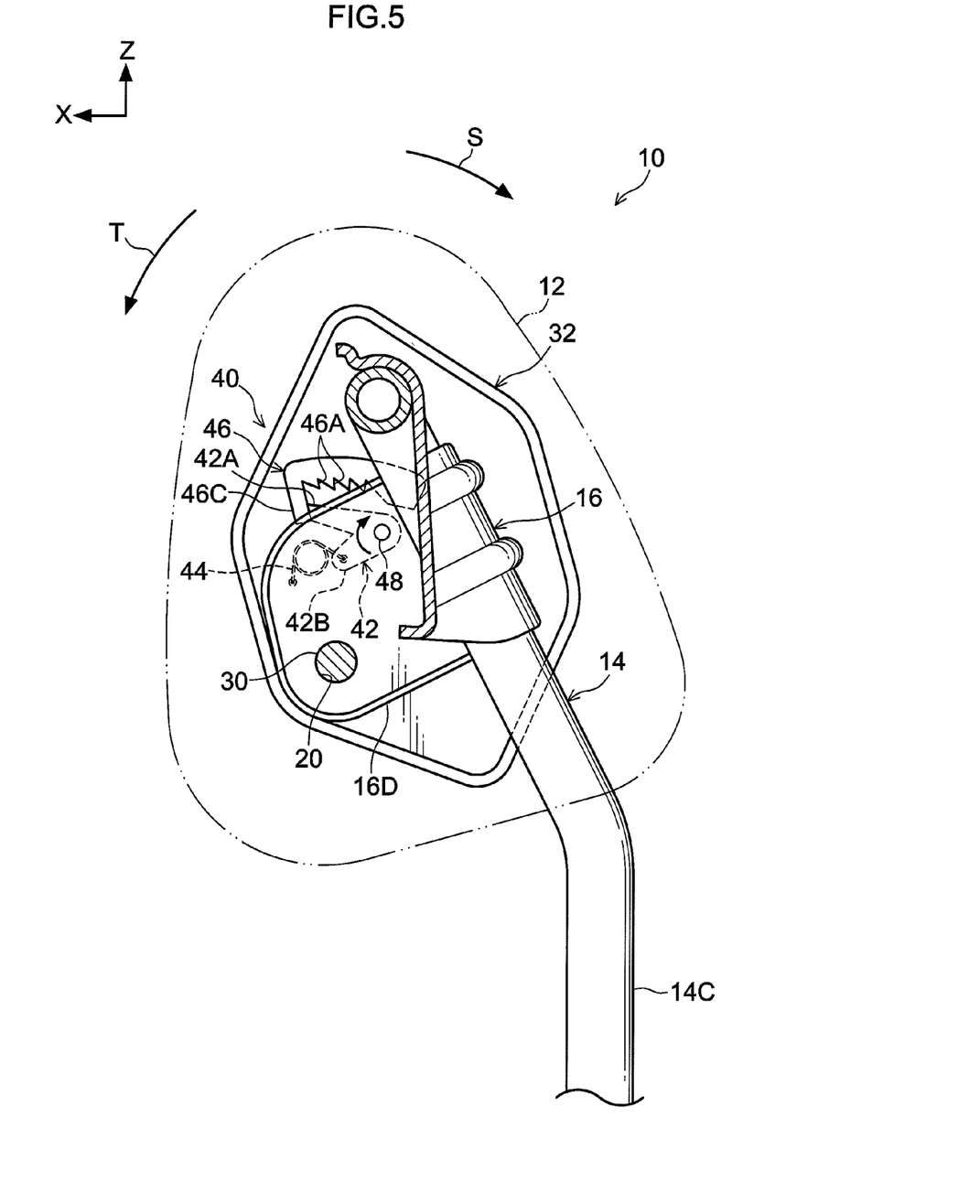
FIG. 5 is a cross-section corresponding to FIG. 3 for explaining a method of returning an angle of tilt of a headrest according to an exemplary embodiment of the present invention to the initial position, illustrating a state in the present exemplary embodiment in which a hook portion of a pawl is engaged with a ratchet teeth portion.

Explanation follows regarding a method for returning the headrest cushion 12 to the initial position. As shown in FIG. 4, when an occupant further tilts the headrest cushion 12 towards the seat front-rear direction front side (the arrow T direction) against the biasing force of the coil springs 34 (in the arrow S direction), the hook portion 42A of the pawl 42 is moved towards the pressing down portion 46B provided at the seat front-rear direction rear side of the ratchet teeth portions 46A. The hook portion 42A is then pressed down by the pressing down portion 46B and rotated towards the seat front-rear direction front side (the arrow T direction). The biasing direction of the reversing torsion spring 44 is thereby reversed, and the pawl 42 is biased towards the seat front-rear direction front side (the arrow T direction) such that the hook portion 42A is held in a position that does not make contact with the ratchet teeth portions 46A. When the occupant releases their hand from the headrest cushion 12 in this state, the side covers 32 are rotated towards the seat front-rear direction rear side (the arrow S direction) about the rotation shaft 30 due to biasing force of the coil springs 34. As shown in FIG. 5, the hook portion 42A of the pawl 42 passes below the ratchet teeth portions 46A and engages with the stopper portion 46C. The pawl 42 is pressed up by the stopper portion 46C and rotates towards the seat front-rear direction rear side (the arrow S direction). This action reverses the biasing direction of the reversing torsion spring 44 once again, and the pawl 42 is biased towards the seat front-rear direction rear side (the arrow S direction), the hook portion 42A of the pawl 42 engages with the ratchet teeth portions 46A, and as shown in FIG. 3, the headrest cushion 12 is held in the initial position.

Explanation follows regarding operation of the present exemplary embodiment.

Figure 6A:
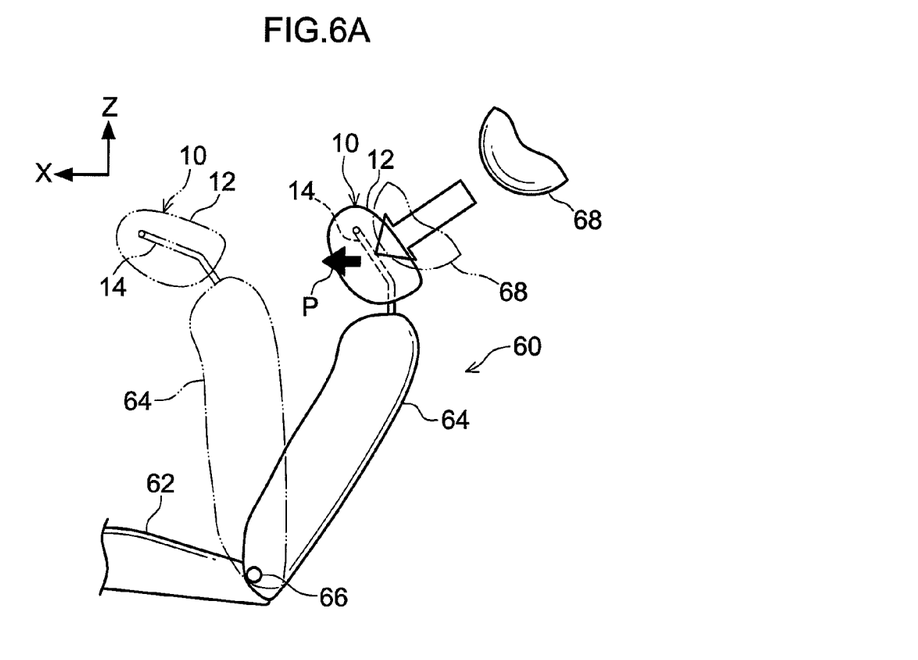
FIG. 6A is a schematic diagram of a vehicle seat equipped with the headrest according to an exemplary embodiment of the present invention, as viewed from the seat width direction outside.

FIG. 6A schematically illustrates a vehicle seat 60 equipped with the headrest 10 according to the present exemplary embodiment. The vehicle seat 60 includes main configuration parts of: a seat cushion 62 for an occupant to sit on; a seat back 64 provided at an end portion at the seat front-rear direction rear side of the seat cushion 62 for supporting the back portion of an occupant; and the headrest 10 according to the present exemplary embodiment provided at an upper end portion of the seat back 64. A reclining mechanism, not shown in the drawings, enables the seat back 64 to be tilted in the seat front-rear direction about a rotation shaft 66 disposed along the seat width direction. FIG. 6A shows a dummy 68 simulating the head portion of an occupant seated in a seat to the rear of the vehicle seat 60 (not shown in the drawings).

Figure 6B:
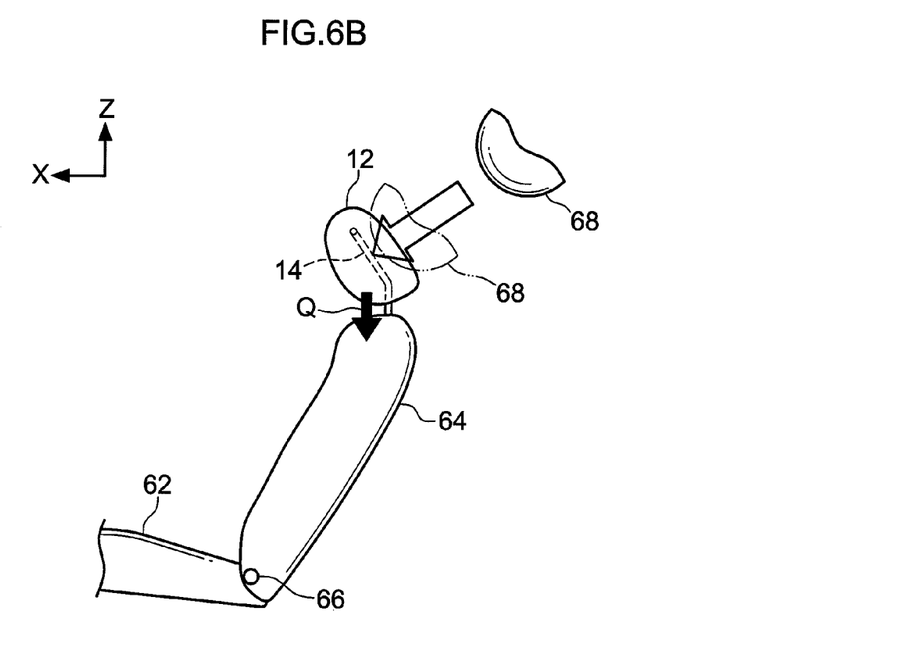
FIG. 6B is a schematic diagram of a vehicle seat equipped with a headrest according to a Comparative Example, as viewed from the seat width direction outside.

In a frontal collision, the head portion of an occupant seated in the seat to the rear of the vehicle seat 60 (not shown in the drawings) moves towards the seat front-rear direction front side (the vehicle front-side) due to inertia, with the possibility that the head portion of the occupant makes contact with the rear portion of the headrest 10 arising. In a state in which the headrest cushion 12 is held in a position tilted to the maximum extent towards the seat front-rear direction front side (the state shown in FIG. 7), when the head portion of the occupant makes contact with the rear portion of the headrest cushion 12 as shown in FIG. 6B, load in the direction (the arrow Q direction) pressing the headrest cushion 12 downwards in the seat height direction is larger than in the state in which the headrest cushion 12 is held in the initial position (the state shown in FIG. 3). As a result the reaction force on the head portion of the occupant is greater due to rotation of the seat back 64 about the rotation shaft 66 towards the seat front-rear direction front side being more difficult than when the headrest cushion 12 is held in the initial position (the state illustrated in FIG. 3).

Figure 7:
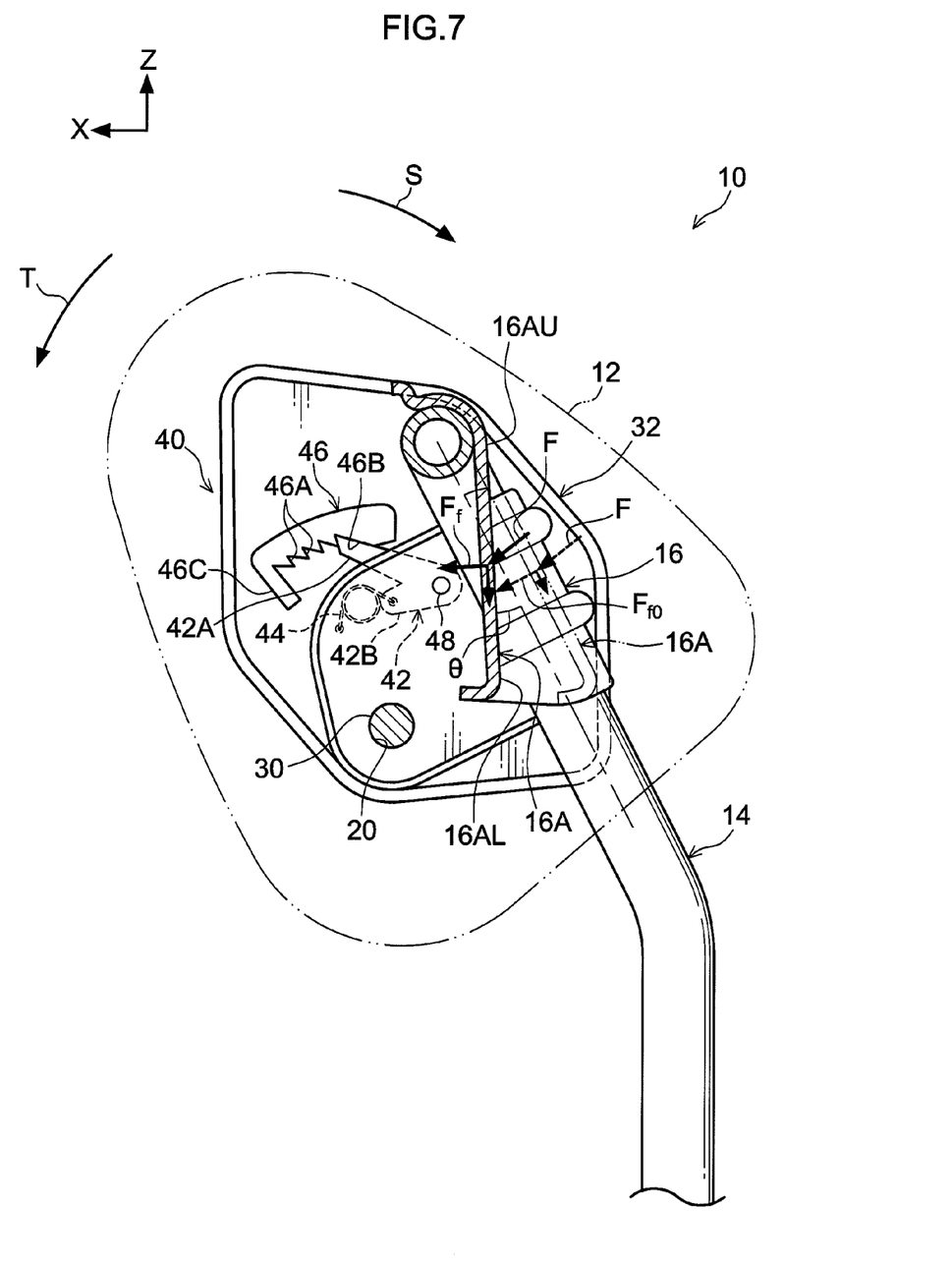
FIG. 7 is a cross-section corresponding to FIG. 3 and illustrating a state in which a headrest cushion of the exemplary embodiment of the present invention is held in a position tilted to the maximum extent.

As a counter measure, as shown in FIG. 7, the pressure bearing member 16 equipped with the inclined wall portion 16A is provided at the headrest frame 14. The inclined wall portion 16A is provided between the side frame sections 14B of the headrest frame 14 so as to correspond to the position of contact of the head portion of the occupant seated in the seat to the rear portion of the headrest cushion 12. Consequently, when the head portion of the occupant seated in the seat makes contact with the rear portion of the headrest cushion 12, a specific load F acts on the inclined wall portion 16A.

The inclined wall portion 16A is inclined at an angle of inclination θ towards the seat front-rear direction front side with respect to the side frame sections 14B such that the lower end portion 16AL is positioned to the seat front-rear direction front side relative to the upper end portion 16AU. Consequently, when the specific load F acts on the inclined wall portion 16A the component force $F_f$ that acts along the seat front-rear direction is larger than in a configuration of a Comparative Example illustrated by double-dot intermittent lines in which the inclined wall portion 16A is not inclined with respect to the side frame sections 14B (angle of inclination θ=0°.

More specifically, when the load F acts on the inclined wall portion 16A, a component force $F_f$ perpendicular to the inclined wall portion 16A is generated. However, in the present exemplary embodiment, due to the inclined wall portion 16A being inclined at the angle of inclination θ with respect to the side frame sections 14B, the component force $F_f$ is generated more towards the upper side in the seat height direction than the component force $F_{f0}$ on the Comparative Example. Since the component force $F_f$, as shown in FIG. 6A, acts in the direction to rotate the seat back 64 towards the seat front-rear direction front side (the arrow P direction), the seat back 64 is readily rotated about the rotation shaft 66 towards the seat front-rear direction front side. Impact to the headrest cushion 12 is absorbed as the seat back 64 is being rotated about the rotation shaft 66 towards the seat front-rear direction front side, and the reaction force on the head portion of the occupant is reduced.

However in the configuration of the Comparative Example in which the inclined wall portion 16A is not inclined with respect to the side frame sections 14B (angle of inclination θ=0°, the perpendicular component force $F_{f0}$ on the inclined wall portion 16A is generated more towards the seat height direction bottom side than the component force $F_f$ of the present exemplary embodiment. It becomes difficult to rotate the seat back 64 about the rotation shaft 66 towards the seat front-rear direction front side due to the component force $F_{f0}$ acting, as shown in FIG. 6B, in the direction (the arrow Q direction) to press the seat back 64 down towards the seat height direction bottom side. Accordingly, the impact to the headrest cushion 12 is not absorbed, or any absorption amount is reduced, and hence the reaction force to the head portion of the occupant is larger.

Whether or not the seat back 64 rotates about the rotation shaft 66 to the seat front-rear direction front side depends on various factors, such as the contact angle of the head portion of the occupant to the headrest cushion 12 (the direction along which the load F acts) and the locking strength of the reclining mechanism. However it should be noted that by inclining the inclined wall portion 16A at the angle of inclination θ with respect to the side frame sections 14B as in the present exemplary embodiment, rotation of the seat back 64 towards the seat front-rear direction front side is facilitated in comparison to a configuration in which the inclined wall portion 16A is not inclined with respect to the side frame sections 14B, and so the probability of being able to reduce the reaction force to the head portion of the occupant can be increased.

In the present exemplary embodiment, the load F acting on the pressure bearing member 16 is efficiently transmitted to the headrest frame 14 due to the pressure bearing member 16 being attached so as to span between the top frame section 14A and the pair of side frame sections 14B of the headrest frame 14. Rotation of the seat back 64 about the rotation shaft 66 towards the seat front-rear direction front side is accordingly facilitated.

Furthermore, configuration in the present exemplary embodiment is such that the inclined wall portion 16A is inclined at the angle of inclination θ towards the seat front-rear direction front side with respect to the side frame sections 14B, and so the thickness of the headrest cushion 12 in the seat front-rear direction can be made thinner. A reduction in weight of the vehicle seat 60 and an increase in vehicle cabin space can therefore be achieved.

Note that while explanation has been given in the above exemplary embodiment of a case in which the tilting mechanism 18 employing the ratchet mechanism 40 serves as the tilting mechanism for adjusting the angle of tilt of the headrest cushion 12 there is no limitation thereto. Configuration may be made using various known tilting mechanisms. It is possible to apply the present exemplary embodiment to a headrest that is not provided with the tilting mechanism 18. The present exemplary embodiment is particularly effective for headrests with large angles of tilt towards the vehicle front-rear direction front side.

Various appropriate changes may also be made, such as to the shape and placement of the pressure bearing member 16 and the inclined wall portion 16A. For example, configuration may be made with the top frame section attachment portion 16B omitted, and with the pressure bearing member 16 only attached to the pair of side frame sections 14B. Configuration may also be made with the side frame section attachment portions 16C omitted, and the pressure bearing member 16 only attached to the top frame section 14A.

Furthermore, while an example has been explained in which the headrest frame 14 in the present exemplary embodiment has an inverted U-shaped profile, various appropriate changes are also possible to the profile of the headrest frame 14.

While the present invention has been explained above by way of exemplary embodiments the present invention is not limited by the exemplary embodiments. Obviously appropriate combinations may be employed of the exemplary embodiments and the various modified examples, and various embodiments obtained in a scope not departing from the spirit of the present invention.

Explanation follows regarding performance testing of a headrest according to the present exemplary embodiment.

Figure 8:
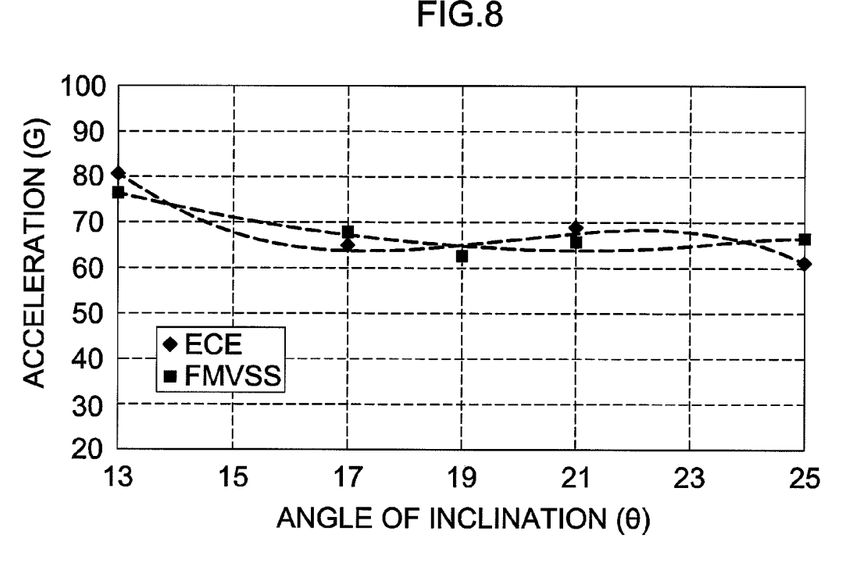
FIG. 8 is a graph illustrating test results for performance testing of a headrest in the present exemplary embodiment.

In the performance tests, as shown in FIG. 6A, a dummy 68 simulating the head portion of an occupant is caused to impact against the rear portion of the headrest cushion 12, and the generated acceleration of the headrest cushion 12 is measured. The angle of inclination θ of the inclined wall portion 16A with respect to the side frame sections 14B is applied as a parameter, and the generated acceleration of the headrest cushion 12 is measured for a total of 7 angles of tilt θ, at angles of inclination θ of 2° steps from 13° to 25°. FIG. 8 is a graph illustrating the relationship between the angle of inclination θ of the inclined wall portion 16A with respect to the side frame sections 14B and the acceleration generated on the headrest 10.

The performance tests are executed according to the Federal Motor-Vehicle Safety Standard (FMVSS) No. 201, and the Economic Commission for Europe (ECE) standard No. 17-08 with the headrest cushion 12 tilted to the maximum extent towards the seat front-rear direction front side.

As a Comparative Example an angle of inclination θ of the inclined wall portion 16A with respect to the side frame sections 14B is set at 0°, and the generated acceleration of the headrest cushion 12 is measured. In the Comparative Example the acceleration of the headrest 10 is 108.0 G on executing according to FMVSS No. 201.

As can be seen from FIG. 8, in the performance test according to FMVSS the acceleration generated in the headrest 10 when the angle of inclination θ is in the range from 13° to 25° is about 65G to 75G, showing a smaller resulting acceleration generated in the headrest 10 than in the Comparative Example for all of the angles of tilt θ. As explained above, this is thought to be due to impact to the headrest cushion 12 being absorbed by the seat back 64 rotating about the rotation shaft 66 towards the seat front-rear direction front side. In performance testing according to the ECE standard too, the acceleration generated to the headrest 10 is about 60G to 80G when the angle of inclination θ is in the range of from 13° to 25°, with a similar performance obtained to that of performance testing according to the FMVSS. The headrest 10 of the present exemplary embodiment can therefore reduce the reaction force to the head portion of an occupant.

What is claimed is:

1. A headrest comprising:
a headrest body that supports a head portion of an occupant;
a pair of side frame sections that supports the headrest body, each of the side frame sections extending along a seat height direction and being inclined towards a front side in a seat front-rear direction with respect to respective headrest stay sections, wherein the pair of side frame sections are disposed at a separation from each other along a seat width direction, the headrest stay sections extending upwardly along the seat height direction in a plane defined by a seat back, the headrest stay sections including an upper portion that is inclined towards the front side in a seat front-rear direction relative thereto, the upper portion defining the pair of side frame sections;
a top frame section that extends along the seat width direction and interconnects upper end portions of each of the side frame sections; and
an inclined wall portion connected to the pair of side frame sections and the top frame section, that is inclined with respect to a plane defined by the pair of side frame sections and lying in the seat width direction such that a lower end portion of the inclined wall portion is spaced from the plane defined by the pair of side frame sections towards the front side in a seat front-rear direction a greater distance than that of an upper end portion of the inclined wall portion, and that bears load acting on a rear side of the headrest body, wherein the inclined wall defines an intermediate part of a pressure bearing member having an inverted T-shaped profile as viewed from a front side of the headrest body, and connects to the pair of side frame sections and the top frame section, wherein the inclined wall portion is provided at a seat width direction intermediate portion of the pressure bearing member.

2. The headrest of claim 1 further comprising a tilting mechanism that is provided at the pair of side frame sections for supporting the headrest body such that the headrest body is capable of being tilted in a seat front-rear direction with respect to the plane defined by the pair of side frame sections.

3. A vehicle seat comprising:
a seat cushion on which an occupant sits;
a seat back that supports a back portion of the occupant, the seat back provided at a rear end portion of the seat cushion to as to be capable of reclining; and
the headrest of claim 1 that is provided at an upper end portion of the seat back for supporting the head portion of the occupant.

* * * * *